United States Patent [19]

Yogo et al.

[11] Patent Number: 4,658,798
[45] Date of Patent: Apr. 21, 1987

[54] TURBOCHARGER CONTROL SYSTEM

[75] Inventors: Kenji Yogo, Nagoya; Isshi Nomura, Aichi, both of Japan

[73] Assignee: Aisin Seiki Kabushiki Kaisha, Kariya, Japan

[21] Appl. No.: 825,540

[22] Filed: Feb. 3, 1986

Related U.S. Application Data

[63] Continuation-in-part of Ser. No. 530,547, Sep. 9, 1983, abandoned.

[30] Foreign Application Priority Data

Sep. 23, 1982 [JP] Japan ............................. 57-165909
Sep. 23, 1982 [JP] Japan ............................. 57-165910

[51] Int. Cl.$^4$ ............................................. F02M 7/12
[52] U.S. Cl. ................................... 123/559; 123/437; 261/DIG. 51
[58] Field of Search ................. 60/605; 123/437, 438, 123/559; 261/121 B, DIG. 51

[56] References Cited

U.S. PATENT DOCUMENTS

| | | | |
|---|---|---|---|
| 2,070,009 | 2/1937 | Goodman | 123/437 |
| 4,142,494 | 3/1979 | Negri et al. | 60/605 X |
| 4,246,752 | 1/1981 | Tryon | 123/559 X |
| 4,541,384 | 9/1985 | Nakazato | 123/559 X |
| 4,558,680 | 12/1985 | Nakazato | 123/559 |

*Primary Examiner*—Michael Koozo
*Attorney, Agent, or Firm*—Oblon, Fisher, Spivak, McClelland & Maier

[57] ABSTRACT

A turbocharger control system utilized in a carburetor system including a carburetor having an air-fuel induction passage, a fuel supply passage supplying fuel to the air-fuel induction passage, and a turbocharger having a compressor impeller compressing an air-fuel mixture flow delivered to an engine intake manifold. The control system includes an air control valve which is positioned between a surge tank in the intake manifold and an air induction passage connected with the fuel supply passage and which controls an air bleeding amount supplied to the air induction passage in response to changes in pressure of the surge tank.

2 Claims, 2 Drawing Figures

TURBOCHARGER CONTROL SYSTEM

This is a continuation-in-part application of U.S. application Ser. No. 530,547 filed Sept. 9, 1983, now abandoned.

BACKGROUND OF THE INVENTION

1. Field of the Invention

This invention relates to turbocharger control systems in general and more particularly to a turbocharger control system utilized in a carburetor system including a turbocharger used with an internal combustion engine.

2. Prior art of the Invention

Turbochargers for vehicle internal combustion engines normally include a compressor impeller that compresses the air gas flow delivered to the intake manifold of the engine. In a conventional carburetor system including a turbocharger, when the air gas flow pressure delivered to the intake manifold reaches an extraordinary high value, the fuel supply will be cut off to prevent the engine from being damaged. At this time, however, a shock is given to the engine and then a speed decrease abruptly occurs, thereby having a negative influence on the engine and presenting a danger to the driver. Therefore, in a carburetor engine including a turbocharger, it is necessary to decrease smoothly the rpm's of the engine when the pressure of the air gas flow compressed by the turbocharger is extraordinarily high.

In particular, in a carburetor engine including a turbocharger positioned between a carburetor and engine cylinder chambers, when the engine is charged by the turbocharger, fuel is sucked from a venturi portion and an idle port by vacuum pressure produced by the turbocharger. Therefore, an air-fuel ratio (A/F) will be in a rich condition, resulting in deterioration of the efficiency of the fuel expense, an increase of the specific fuel consumption (FE).

SUMMARY OF THE INVENTION

One general object of the present invention, therefore, is to provide a new and improved turbocharger control system which eliminates the disadvantages of the prior art turbocharger control systems.

More particularly it is an object of the present invention to provide a new and improved turbocharger control system wherein the air-fuel ratio is caused to be in a lean condition to decrease smoothly the rpm's of the engine when the pressure of the air gas flow compressed by a turbocharger is extraordinarily high.

It is a further object of the present invention to provide a new and improved turbocharger control system wherein the air-fuel ratio is maintained so as to be in an ideal condition, namely a stoichiometric air-fuel ratio, in a carburetor engine including a turbocharger positioned between a carburetor and the engine cylinder chambers.

It is another object of the present invention to provide a new and improved turbocharger control system, utilizing comparatively simple mechanical components, which is economical to manufacture and thoroughly reliable in operation.

In one illustrative embodiment of the present invention, in a carburetor system including a turbocharger there is provided a turbocharger control system including an air control valve which is positioned between an air induction passage of a carburetor and a surge tank and which controls an air bleeding amount supplied to the air induction passage by detecting the air supply pressure in the surge tank. Therefore, when the air supply pressure becomes extraordinarily high, the air-fuel ratio will be in a lean condition by operation of the air control valve, thereby preventing engine damage caused by detonation.

In another illustrative embodiment of the present invention, in a carburetor system including a turbocharger positioned between a carburetor and cylinder chambers there is provided a turbocharger control system including an air control valve which is positioned between an air induction passage of the carburetor and a surge tank and which controls an air bleeding amount supplied to the air induction passage in response to charging conditions of the turbocharger. Therefore, the air-fuel ratio is maintained so as to be at an optimum condition in response to charging conditions of the turbocharger, thereby improving the efficiency of consumption.

Other objects, features and advantages of the present invention will become more apparent upon reference to the succeeding detailed description thereof, and to the drawings illustrating preferred embodiments thereof.

DETAILED DESCRIPTION OF THE PREFERRED EMBODIMENT

Figure 1:
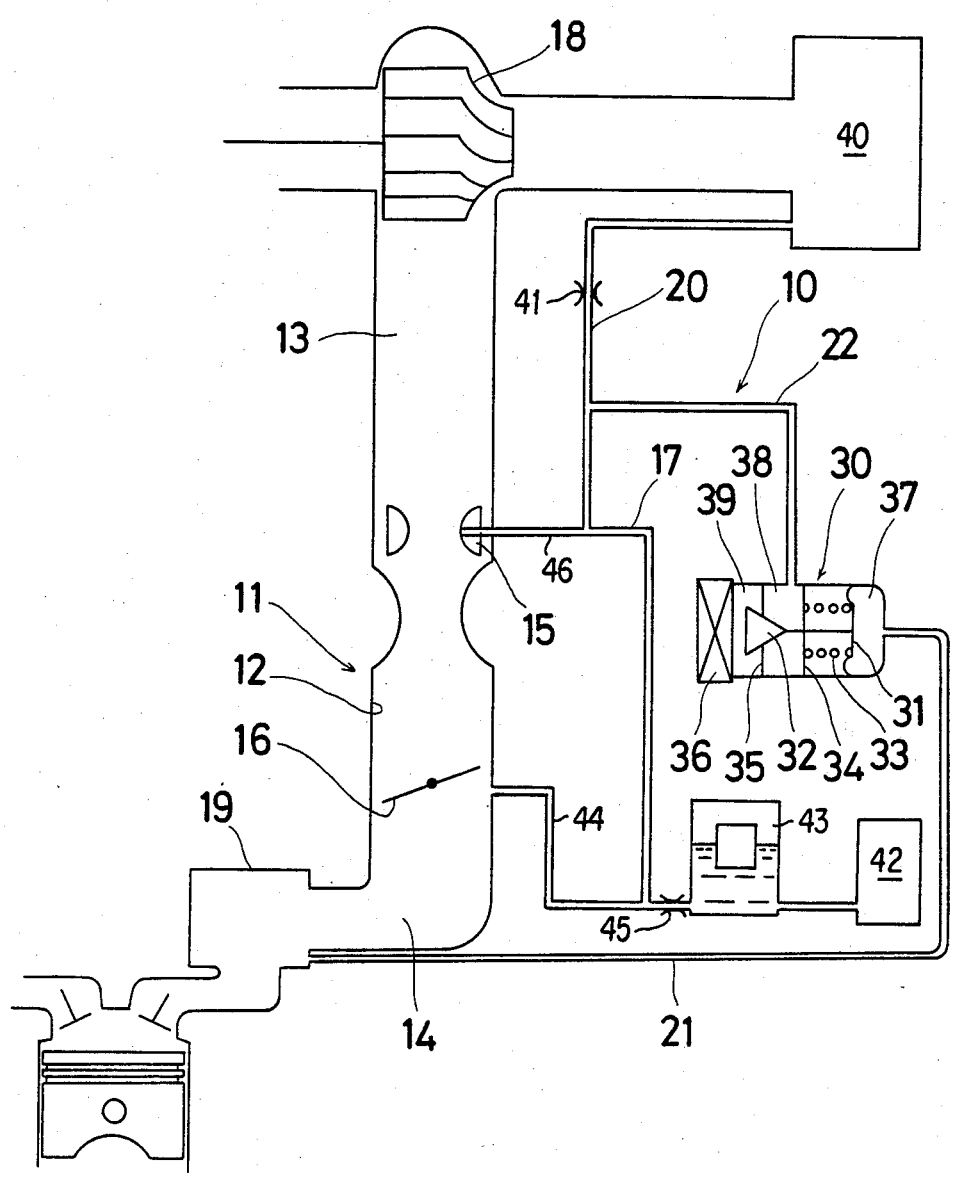
FIG. 1 is a schematic sectional view of a turbocharger control system in accordance with one illustrative embodiment of the present invention.

Referring now to FIG. 1 of the drawings, there is shown a carburetor system associated with a turbocharger control system 10 according to the invention. A carburetor 11 includes a usual air-fuel induction passage 12 with an atmospheric air inlet 13 at one end and connected to an engine intake manifold 14 at the opposite end. The induction passage 12 contains a usual fixed area venturi 15 and a throttle valve 16 which is rotatably mounted on a part of the carburetor body across the passage 12 to control the flow of air-fuel mixture into the intake manifold 14. Fuel is inducted in the usual manner from a fuel tank 42, float chamber 43 and through a conventional orifice 45 and then from a fuel supply passage 17 into the passage 12. A turbocharger includes a compressor impeller 18 located in the air inlet 13 and downstream of a conventional air cleaner 40 to deliver the air-fuel mixture to the intake manifold 14 at a pressure determined by the speed of the compressor.

There is provided an air control valve 30 which controls the communication between a second chamber 38 and a third chamber 39 in response to changes in pressure of a first chamber 37. The air control valve 30 comprises a diaphragm 31 having a valve member 32, a spring 33 biasing the diaphragm 31 in a direction such that the valve chamber 32 is maintained in a closed position against the pressure in the first chamber 37, a retainer plate 34 supporting the spring 33, a valve seat 35 being in contact with the valve member 32, and an air filter 36. The diaphragm 31, the retainer plate 34 and the valve seat plate 35 define the first chamber 37 connected with a surge tank 19 through a passage 21, the second chamber 38 connected with an air induction passage 20 through an air passage 22, and the third chamber 39 connected with the atmosphere through the air filter 36.

The air induction passage 20 communicates with the air cleaner 40 and fuel is supplied from the fuel tank 42 to the main fuel supply passage 46 and a slow fuel passage 44 through the float chamber 43, orifice 45 and the fuel supply passage 17. The air induction passage 20 bleeds air from the air cleaner 40 into the fuel supply passage 17 communicating with the main fuel supply passage 46 and slow fuel supply passage 44 through the orifice 41, whereby the air-fuel ratio is prevented from being in rich condition and atomization of the air-fuel mixture is promoted when fuel is injected into the air-fuel induction passage 12 from the main fuel supply passage 46 and the slow fuel supply passage 44.

In operation, when the air supply pressure in the surge tank 19 rises beyond a predetermined value, the air supply pressure will act on the diaphragm 31 through the passage 21, thereby maintaining the valve member 32 in its opened position, namely spacing the valve member 32 from the valve seat plate 35, against the biasing force of the spring 33. Accordingly, the air flowing into the third chamber 39 is supplied to the air induction passage 20 through the second chamber 38 and the air passage 22, whereby the air-fuel ratio can be adjusted so as to be a lean condition.

Since the valve member 32 is in a tapered form as shown in the drawing, an opened area of the valve member 32 increases in proportion to the air supply pressure in the surge tank 19.

Figure 2:
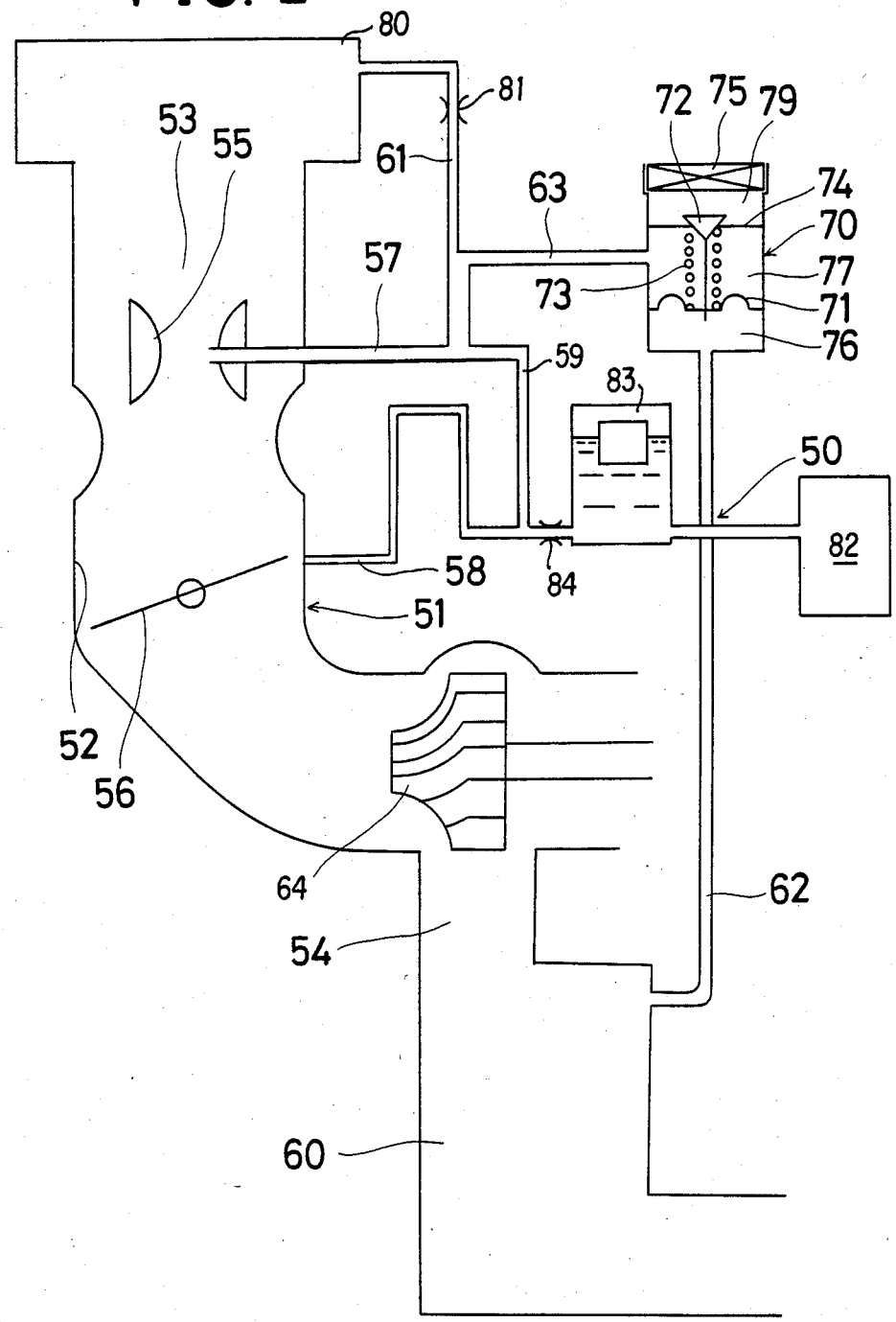
FIG. 2 is a schematic sectional view of a turbocharger control system in accordance with another illustrative embodiment of the present invention.

Referring next to FIG. 2, there is shown a carburetor system associated with a turbocharger control system 50 according to another illustrative embodiment of the invention. A carburetor 51 includes a usual air-fuel induction passage 52 with an atmospheric air inlet 53 at one end and connected to an engine intake manifold 54 at the opposite end. The induction passage 52 contains a usual fixed area venturi 55 and a throttle valve 56. A turbocharger includes a compressor impeller 64, which is positioned between the carburetor 51 and engine cylinder chambers (not shown), to deliver the air-fuel mixture to the intake manifold 54 at a pressure determined by the speed of the compressor. Fuel is inducted from fuel tank 82, float chamber 83, through a conventional orifice 84 and into the induction passage 52 from a main fuel supply 57 and a slow or secondary fuel passage 58 which are connected with fuel tank 82 via float chamber 83 through a fuel supply passage 59.

There is provided an air control valve 70 which controls communication between a second chamber 77 and a third chamber 79 in response to changes in pressure of a first chamber 76. The air control valve 70 comprises the diaphragm 71 having a valve member 72, a spring 73 biasing the diaphragm 71 in a direction such that the valve member 72 is maintained in a closed position against the pressure in the first chamber 76, a valve seat plate 74 supporting the spring 73 and being in contact with the valve member 72, and an air filter 75. The diaphragm 71 and the valve seat plate 74 define the first chamber 76 connected with a surge tank 60 through a passage 62, the second chamber 77 connected with an air induction passage 61 through an air passage 63, and the third chamber 79 connected with the atmosphere through the air filter 75.

Air induction passage 61 communicates with the air cleaner 80 via constriction 81 and fuel is supplied from the fuel tank 82 into the main fuel supply passage 57 and the slow fuel supply passage 58 via float chamber 83, orifice 84 and the main fuel supply passage 57. The air induction passage 61 bleeds air from the air cleaner 80 into the fuel supply passage 59 communicated with a main fuel supply passage 57 and slow fuel passage 58 through the orifice 81, whereby the air-fuel ratio is prevented from being in a rich condition and atomization of the air-fuel mixture is promoted when fuel is injected into the air-fuel induction passage 52 from the main fuel supply passage 57 and the slow fuel supply passage 58.

In operation, when the engine is charged by the turbocharger, the air supply in the surge tank 60 will increase, and then the increased pressure will act on the first chamber 76 of the air control valve 70 through the passage 62. At this time, the valve member 72 is moved upwardly with the diaphragm 74 against the biasing force of the spring 73, thereby maintaining the valve member 72 in its opened position, namely spacing the valve member 72 from the valve seat plated 74. Accordingly, the air flowing into the third chamber 79 through the air filter 75 is supplied to the air induction passage 61 through the second chamber 77 and the air passage 63, resulting in the fact that the air will flow into the venturi 55. Since the imbalance in the air-fuel ratio is corrected properly in this way, it may be possible to attain an ideal air-fuel ratio corresponding to the charging conditions of the turbocharger, thereby improving the efficiency of the fuel expense and the performance of the engine output power.

As indicated above, the air control valves 30, 70 comprises a mechanical construction. Instead of the air control valves 30, 70 it may be possible to install an electromagnetic solenoid type air control valve wherein air flow is controlled in proportion to the energizing current to the valve actuating solenoid. Furthermore, it may be apparent that there can be provided sensor means for detecting electromagnetically the pressure of the surge tank.

It should be understood that the preferred embodiments of the present invention have been described herein in considerable detail and that certain modifications, changes, and adaptations may be made therein by those skilled in the art and that it is hereby intended to cover all modifications, changes, and adaptations thereof falling within the scope of the appended claims.

What is claimed is:

1. A turbocharger control system utilizing a carburetor system including a carburetor having an air-fuel induction passage, a fuel supply passage for supplying fuel to said air-fuel induction passage, and a turbocharger compressor impeller disposed upstream of a throttle valve and compressing an air-fuel mixture flow delivered to an engine intake manifold, said turbocharger control system comprising:

a surge tank provided in said intake manifold;

an air control valve including means for controlling an air bleeding amount supplied to said air induction passage in response to changes in pressure of said surge tank wherein said air control valve further comprises a valve housing having an end wall and including a first, second and third chamber formed therein and a diaphragm having a valve member for controlling communication between said second chamber and said third chamber in response to a pressure existing in said first chamber, a spring biasing said diaphragm in a direction such that said valve member is maintained in a closed position against said pressure in said first chamber, and a valve seat plate in contact with said valve member, and wherein said first chamber is connected with said surge tank and said second chamber is connected with said fuel supply passage, said third chamber is connected with atmosphere, said first chamber is defined by a valve housing of said air control valve, said end wall and said diaphragm and wherein said valve member has a tapered form.

2. A turbocharger control system utilizing a carburetor system including a carburetor having an air-fuel induction passage, a fuel supply passage for supplying fuel to said air-fuel induction passage, and a turbocharger compressor impeller disposed downstream of a throttle valve and compressing an air-fuel mixture flow delivered to an engine intake manifold, said turbocharger control system comprising:

a surge tank provided in said intake manifold;

an air control valve including means for controlling an air bleeding amount supplied to said air induction passage in response to a charging condition of said turbocharger wherein said air control valve further comprises a valve housing having an end wall and including a first, second and third chamber formed therein and a diaphragm having a valve member for controlling communication between said second chamber and said third chamber in response to a pressure existing in said first chamber, a spring biasing said diaphragm in a direction such that said valve member is maintained in a closed position against said pressure in said first chamber, and a valve seat plate in contact with said valve member, and wherein said first chamber is connected with said surge tank and said second chamber is connected with said fuel supply passage, said third chamber is connected with atmosphere, said first chamber is defined by a valve housing of said air control valve, said end wall and said diaphragm and wherein said valve member has a tapered form.

* * * * *